US010471687B2

(12) United States Patent
Moser Rossel

(10) Patent No.: US 10,471,687 B2
(45) Date of Patent: Nov. 12, 2019

(54) FLEXIBLE FINISHED WOOD LAMINATE AND PRODUCTION PROCESS

(76) Inventor: Roberto Felipe Moser Rossel, Vitacura CP (CL)

(*) Notice: Subject to any disclaimer, the term of this patent is extended or adjusted under 35 U.S.C. 154(b) by 0 days.

(21) Appl. No.: 13/575,870

(22) PCT Filed: Jan. 28, 2010

(86) PCT No.: PCT/CL2010/000005
§ 371 (c)(1),
(2), (4) Date: Jul. 27, 2012

(87) PCT Pub. No.: WO2011/091547
PCT Pub. Date: Aug. 4, 2011

(65) Prior Publication Data
US 2012/0288704 A1 Nov. 15, 2012

(51) Int. Cl.
| B32B 27/10 | (2006.01) |
| B32B 27/06 | (2006.01) |
| B32B 21/08 | (2006.01) |
| B32B 7/12 | (2006.01) |
| B32B 15/04 | (2006.01) |
| B32B 27/12 | (2006.01) |
| B32B 27/16 | (2006.01) |
| B32B 27/32 | (2006.01) |

(52) U.S. Cl.
CPC ............... *B32B 21/08* (2013.01); *B32B 7/12* (2013.01); *B32B 15/04* (2013.01); *B32B 27/06* (2013.01); *B32B 27/10* (2013.01); *B32B 27/12* (2013.01); *B32B 27/16* (2013.01); *B32B 27/32* (2013.01); *B32B 2307/50* (2013.01); *B32B 2307/558* (2013.01); *B32B 2419/06* (2013.01); *B32B 2479/00* (2013.01); *B32B 2607/00* (2013.01); *Y10T 428/249921* (2015.04); *Y10T 428/31902* (2015.04)

(58) Field of Classification Search
CPC ......... B32B 28/10; B32B 27/06; B32B 27/10; B32B 27/32; B32B 27/12; B32B 27/16; B32B 15/14; B32B 15/04; B32B 2479/00; B32B 2419/06; B32B 2607/00; B32B 7/12; B32B 21/14; B32B 21/10; B32B 2317/02; B27D 1/00; C08L 97/02; C08L 87/02; E04F 13/10; Y10T 428/27; Y10T 428/31819; Y10T 428/31823; Y10T 428/253; Y10T 428/3188; Y10T 428/31982; Y10T 428/31989; Y10T 442/654; Y10T 442/695; B44C 5/0469; B44C 5/043; B44F 9/02
USPC ........ 144/346, 348, 352, 381; 156/154, 264, 156/313; 428/326, 221, 337, 491, 507, 428/516, 537.1
See application file for complete search history.

(56) References Cited

U.S. PATENT DOCUMENTS

| 2,452,226 A * | 10/1948 | Cone ......................... B27B 1/00 156/264 |
| 3,231,457 A | 1/1966 | Meissner |
| 3,556,915 A * | 1/1971 | Stanley et al. ................ 428/339 |
| 3,870,594 A * | 3/1975 | Kudo ............................ 428/220 |
| 3,960,639 A | 6/1976 | Kudo |
| 4,282,120 A | 8/1981 | Cisterni |
| 5,073,431 A * | 12/1991 | Martinuzzo ............... B27D 1/00 144/346 |
| 5,187,000 A * | 2/1993 | Chow ...................... B32B 21/06 428/141 |
| 6,048,431 A * | 4/2000 | Clements et al. ............ 156/247 |
| 2004/0209099 A1 | 10/2004 | Ohyanagi |

FOREIGN PATENT DOCUMENTS

| DE | 2019770 A1 | 11/1971 | |
| EP | 1424193 A1 | 6/2004 | |
| FR | 2652539 A1 * | 4/1991 | ............... B27D 1/00 |
| FR | 2652539 A1 | 4/1991 | |
| JP | 59 075972 A | 4/1984 | |
| WO | 2002028636 A1 | 4/2002 | |

OTHER PUBLICATIONS

International Search Report for PCT/CL2010/000005, filed Jan. 28, 2010.
Extended European Search Report for European Patent Application No. 10844326.8 dated Dec. 6, 2013.

* cited by examiner

*Primary Examiner* — Camie S Thompson
(74) *Attorney, Agent, or Firm* — Pepper Hamilton LLP

(57) ABSTRACT

Highly flexible finished wood laminate, formed by several substrates that include a transparent plastic film finish, a layer of pre-varnished sanded wood, a plastic film with corona treatment on both faces and a flexible substrate. It is easy to affix using glue on straight and shaped surfaces and even adapts to acute corners without cracking; manufacturing process for the laminate.

11 Claims, No Drawings

FLEXIBLE FINISHED WOOD LAMINATE AND PRODUCTION PROCESS

This application is a national stage application under 35 U.S.C. § 371 of PCT Application No. PCT/CL2010/000005, filed Jan. 28, 2010, which is hereby incorporated by reference in its entirety.

BRIEF

Finished wood laminate with a high flexibility in the direction of the grain, formed by several substrates, which is easy to affix using glue on straight and shaped surfaces and even adapts to acute corners without cracking, for finishing walls, furniture, coverings, door faces, wood moldings and many other wood-finish products, flat or with curves, corners, radiuses or as indicated in the design and in the direction of the grain. Can also be affixed to a metal support such as aluminum, zincalume or galvanized iron, which is subsequently bent into different shapes in the direction of the grain of the wood which, due to its high flexibility, is resistant to cracking. This allows for a wide range of wood-finish profiles to be created, forming linear color coverings and ceilings that have so far been widely used in public spaces such as airports and shopping malls.

Wood laminate is a very well known use of wood for finishing furniture, doors and wall coverings. In other words, the parts to be used are cut to the size of the furniture or covering from a low-cost material such as particle board, medium-density fiberboard (MDF), plywood, etc. and layered with a thin wood laminate called a veneer. This process consists of applying a cold glue to the substrate, placing the wood veneer on top and applying pressure. Direct wall covering, which is less used given its high level of complexity and costs, involves an artisanal process in which contact adhesives are used to affix the veneer to the wall, which is then sanded and varnished.

An alternative way of working with flexible finished wood laminate is by affixing the veneer to a highly flexible substrate (fabric used to be commonly used), sanding it to thin it and give it flexibility and then applying a varnish. These processes can be used to create bendable coverings for corners of walls, but they also create a weak point in the product as it undergoes a controlled fracture, leaving small cracked splinters which can become unstuck, ultimately affecting the durability of the covering. This is because a consistent application of varnish cannot be guaranteed among the wood fibers. This process is also difficult and expensive.

The invention is a highly flexible finished wood laminate, formed by several substrates arranged in the following order: a transparent plastic film finish, a sanded and pre-varnished veneer, a plastic film with corona treatment on both faces and a flexible support. The transparent plastic film may be made from polypropylene, polyethylene, PVC or polyester. The flexible support may consist of cellulose and synthetic papers. Its composition is determined by the glue used to apply the laminate to the product to be covered. The first process in manufacturing this highly flexible finished wood laminate is to affix the veneer to a flexible substrate using a plastic film with corona treatment on both faces, which is laminated with heat and temperature between both elements. The wood face of the veneer is then sanded and pre-varnished, giving firmness to the substrate affixed to the veneer using the plastic film. Since both the flexible support and the plastic film with corona treatment on both faces are wound into rolls, the wood face of the veneer can be continuously sanded and pre-varnished. Once this level of finish is reached, i.e. sanding and pre-varnishing, a transparent plastic film finish is applied, which binds the wood fibers together to give them continuity, resulting in a high level of flexibility in the direction of the grain. This transparent plastic film finish is affixed using a glue which is pre-applied to the film or using a corona treatment on the film, in both cases on the face which is affixed to the pre-varnished side, which is then laminated by rolls applying heat and pressure. This transforms the product from a wood veneer into a very thin laminate with a wood veneer interior, providing its aesthetic quality, while the other components give it its flexibility in the direction of the grain. In some cases, one or more affixing processes may be applied using a flexible glue, which does not affect the overall flexibility of the product. The process of affixing the highly flexible finished wood laminate to a metal laminate may also be carried out using a flexible glue, capable of withstanding the subsequent bending process.

The flexible finished wood laminate can be used in a wide range of products for covering walls, molding and for general fine wood finishes. The final use of the product depends on the properties of the film applied after pre-varnishing and on the pre-varnishing itself. The product can be used as a primer for furniture and coverings and, once mounted, the finish layer is affixed using a contact glue or cold glue. When applied to a wall, the type of glue used must be carefully selected. For water-based glues such as wallpaper pastes, the wall must allow for humidity to escape since manufacturing processes can leave laminates impermeable to water both on the front and back faces. A self-adhesive glue may be applied to the back of the flexible laminate, with the corresponding silicon paper, with which it may be affixed to any substrate such as an impermeable wall, glass, varnished wood, etc. and which transform the laminate into a product that anyone can install at home.

The invention claimed is:

1. Highly flexible finished wood laminate consisting of three materials (i), (ii), and (iii), which is easy to affix on straight and shaped surfaces and adapts to acute corners without cracking, with the materials set out in an order consisting of:
    (i) wood veneer comprising a sanded and varnished face and a transparent plastic film finish applied to the sanded and varnished face to form a wood veneer having a single finished face, said veneer having a grain and being flexible in the direction of the grain;
    (ii) plastic film with corona treatment on both faces of the plastic film; and
    (iii) flexible substrate consisting of cellulose paper, synthetic paper, or fabric, wherein the plastic film affixes the veneer to the flexible substrate with the varnished face of the veneer being opposite the plastic film.

2. Highly flexible wood laminate, as described in claim 1, wherein the plastic film with corona treatment on both faces comprises polyethylene.

3. Highly flexible wood laminate, as described in claim 1, wherein the transparent plastic film finish comprises polypropylene.

4. Highly flexible wood laminate, as described in claim 1, with a metal laminate affixed using a flexible glue beneath the flexible substrate which supports the veneer.

5. Highly flexible wood laminate, as described in claim 1, wherein the flexible substrate is fabric.

6. Highly flexible wood laminate, as described in claim 1, wherein the flexible substrate is a cellulose paper or synthetic paper.

7. Highly flexible wood laminate, as described in claim 1, wherein said transparent plastic film finish is affixed to the varnished face by means of corona treatment, pressure and heat.

8. A manufacturing process for highly flexible finished wood laminate, said process comprising:
- affixing a wood veneer having a grain and being flexible in the direction of the grain onto a flexible substrate using only a polyethylene film with corona treatment on both faces between the wood veneer and the flexible substrate by applying pressure and heat, wherein the flexible substrate consists of cellulose paper, synthetic paper, or fabric;
- winding the veneer affixed onto the flexible substrate into a roll;
- sanding a face of the wood veneer opposite the polyethylene film; and
- varnishing the face of the wood veneer.

9. The manufacturing process of claim 8 further comprising:
- affixing a plastic film finish layer to the varnished face of the wood veneer using pressure and heat.

10. The manufacturing process of claim 9 further comprising:
- affixing the highly flexible finished wood laminate to a metal laminate using a polyethylene film with corona treatment on both faces, laminated between both substrates, applying pressure and heat.

11. The manufacturing process of claim 9 further comprising:
- affixing the highly flexible finished wood laminate to a metal laminate using flexible glue.

\* \* \* \* \*